US012693490B2

(12) United States Patent
Xu et al.

(10) Patent No.: US 12,693,490 B2
(45) Date of Patent: Jul. 28, 2026

(54) LENS MODULE AND ELECTRONIC DEVICE

(71) Applicant: Changzhou AAC Raytech Optronics Co., Ltd., Changzhou City (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 309 days.

(21) Appl. No.: 18/536,281

(22) Filed: Dec. 12, 2023

(65) Prior Publication Data

US 2024/0337809 A1     Oct. 10, 2024

Related U.S. Application Data

(63) Continuation of application No. PCT/CN2023/086099, filed on Apr. 4, 2023.

(51) Int. Cl.
*G02B 7/04* (2021.01)
*H04N 23/55* (2023.01)

(52) U.S. Cl.
CPC ............... *G02B 7/04* (2013.01); *H04N 23/55* (2023.01)

(58) Field of Classification Search
CPC ............. G02B 7/04; G02B 7/08; H04N 23/55
See application file for complete search history.

(56) References Cited

U.S. PATENT DOCUMENTS

2019/0377241 A1* 12/2019 Lee ........................... G03B 5/00

* cited by examiner

*Primary Examiner* — Mariam Qureshi
(74) *Attorney, Agent, or Firm* — Wiersch Law Group

(57) ABSTRACT

The disclosure relates to the technical field of optical systems, and relates to a lens module and an electronic device. The lens module includes a bearing structure, a support frame, a lens barrel, and an adjusting mechanism. An upper shell of the bearing structure includes a top cover and a side wall connected with the base. The support frame is suspended inside the bearing structure. In the lens module of this embodiment, by arranging the focus magnet inside the top cover of the upper shell, the internal space of the upper shell can be fully utilized to make the structure between the lens barrel, the focus assembly, and the upper shell more compact, thereby making the overall structure of the lens module more compact.

12 Claims, 7 Drawing Sheets

A-A

B

C

LENS MODULE AND ELECTRONIC DEVICE

CROSS REFERENCE TO RELATED APPLICATIONS

The present application is a continuation of PCT Patent Application No. PCT/CN2023/086099, filed Apr. 4, 2023, which is incorporated by reference herein in its entirety.

TECHNICAL FIELD

The various embodiments described in this document relate in general to the technical field of optical systems, and more specifically to a lens module and an electronic device.

BACKGROUND

With the development of camera technologies, lens modules with auto focus (AF) and optical image stabilizer (OIS) have been widely used in electronic devices, such as tablet computers and smart phones.

In the traditional lens module, the AF and OIS function are generally achieved through separate coils and magnets. In practical applications, there is a need to use the combination of multiple coils and multiple magnets in the lens module, which requires a large number of parts, and thus leads to the increase of the volume and weight of the whole module. When applied to electronic devices, the lens module may lead to the increase of the volume of the electronic device. In addition, when multiple parts are installed on the movable members, the overall mass of the movable members may increase, which may directly affect the accuracy and stability of focus and anti-shaking, thus directly affecting the performance of the lens module. Moreover, the circuit structure in the existing lens module is complex, which mainly lies in the fact that all components in the lens module need to be connected through complex wires, which not only leads to the complex internal structure of the lens module, but also easily affects the movement of the movable members.

Therefore, it is necessary to miniaturize the lens module on the premise that the functionality of the lens module is ensured.

SUMMARY

The present disclosure provides a lens module and an electronic device for solving the problem of increasing the volume and mass of an existing lens module due to a large number of parts in the lens module, which leads to an increase in the overall volume of the electronic device as well as an impact on the performance of the lens module.

In some embodiments, a lens module is provided. The lens module includes a bearing structure including an upper shell and a base, where the upper shell includes a top cover and a side wall connected with the base, and the top cover is disposed at a side of the side wall away from the base, and the base is configured to be electrically connected with an external circuit; a support frame suspended inside the bearing structure; a lens barrel suspended inside the support frame; and an adjusting mechanism including a focus assembly, an anti-shake assembly, a plurality of elastic piece structures, and suspension wires, where the focus assembly includes a focus coil, a focus magnet, and a focus circuit board, the focus coil is wound on the lens barrel, the focus magnet is connected to a side of the top cover facing the focus coil, and the anti-shake assembly is configured to drive the support frame to move relative to the base, where the plurality of elastic piece structures are connected between the lens barrel and the support frame, each respective suspension wire of the suspension wires is connected and electrically connected with the support frame and the base, the focus circuit board is disposed on the lens barrel, and a respective elastic piece structure is electrically connected with the focus circuit board, the anti-shake assembly, and the support frame.

In some embodiments, the respective elastic piece structure includes an upper elastic piece and a lower elastic piece, where the upper elastic piece is disposed on one side of two opposing sides of the support frame and the lower elastic piece is disposed on another side of the two opposing sides of the support frame, and where the upper elastic piece is connected to the lens barrel and the support frame, the lower elastic piece is connected to the lens barrel and the support frame, and the support frame is electrically connected with the focus coil, and where the respective suspension wire is connected and electrically connected with the respective upper elastic piece and the base.

In some embodiments, the upper elastic piece includes at least one first flexible arm and at least two first connecting portions, where the at least two first connecting portions are connected between the lens barrel and the support frame, each of the at least one first flexible arm is connected to the at least two connecting portions, and an end of two opposing ends of the respective suspension wire is connected and electrically connected with a respective first connecting portion and another end of the two opposing ends of the respective suspension wire is connected and electrically connected with the base.

In some embodiments, the lower elastic piece includes a flexible connecting arm and at least two reset and fixing portions connected to the flexible connecting arm, where two of the at least two reset and fixing portions are respectively connected to the lens barrel and the support frame.

In some embodiments, the anti-shake assembly includes at least one anti-shake coil, at least one anti-shake magnet, and an anti-shake circuit board, where the base defines at least one receiving groove, each respective anti-shake magnet is accommodated in a respective receiving groove and is arranged corresponding to a respective anti-shake coil, the anti-shake circuit board is attached to a side of the support frame facing the respective anti-shake magnet, and the anti-shake coil is disposed on a side of the anti-shake circuit board facing the anti-shake magnet.

In some embodiments, the support frame includes a frame body and a frame insert embedded in the frame body, and the frame insert is electrically connected with the plurality of elastic piece structures and the anti-shake circuit board.

In some embodiments, the focus assembly further includes a focus IC module connected to the focus circuit board, and the focus IC module is electrically connected with the plurality of elastic piece structures, and where the adjusting mechanism further includes a sensing magnet, and the sensing magnet is disposed on the support frame, and where the focus IC module is magnetically cooperated with the sensing magnet, and the focus IC module is electrically connected with the focus coil, to enable that the focus IC module forms a closed-loop control circuit.

In some embodiments, the lens barrel defines a mounting slot on an outer circumferential wall of the lens barrel, and the focus coil is wound around the lens barrel and accommodated in the mounting slot, and where the lens barrel defines an avoidance cavity on a side of the lens barrel facing the focus magnet, and the focus magnet is suspended in the avoidance cavity.

In some embodiments, an electronic device is provided and includes a host device and the lens module describe in any of the above embodiments of the disclosure.

Implementing the technical solution of the disclosure has following technical advantages.

In the lens module of the present embodiment, by disposing the focus magnet inside the top cover of the upper shell, the inner space of the upper shell can be fully utilized to make the structure between the lens barrel, the focus assembly, and the upper shell more compact, thereby making the overall structure of the lens module more compact and facilitating arrangement of the lens module in an electronic device. In addition, the power supply and signal transmission functions of the lens module can be realized by using the elastic piece structures to lead to the focus assembly and the anti-shake assembly, such that the purpose of optimizing the internal structure of the lens module can be further achieved.

In addition, by arranging the focus magnet in the upper shell (equivalent to a fixed part) of the bearing structure, compared with the conventional scheme in which the magnet is arranged on the movable member of the lens module, the overall mass of the movable member can be effectively reduced, the required driving force can be reduced when the focus assembly moves, and the movement accuracy can be improved. The problem that the focus magnet attracts or repels other members of the lens module during moving of the focus assembly and the anti-shake assembly can also be effectively avoided, thereby improving the control accuracy of the lens module.

BRIEF DESCRIPTION OF THE DRAWINGS

In order to explain more clearly the embodiments of the disclosure or the technical aspects of the related technologies, the drawings required to be used in the description of the embodiments or related technologies will be briefly described below. It will be obvious that the drawings described below are only some embodiments of the disclosure, and other drawings may be obtained from these drawings without creative effort for those of ordinary skill in the art.

4

SYMBOL DESCRIPTION

Figure 1:
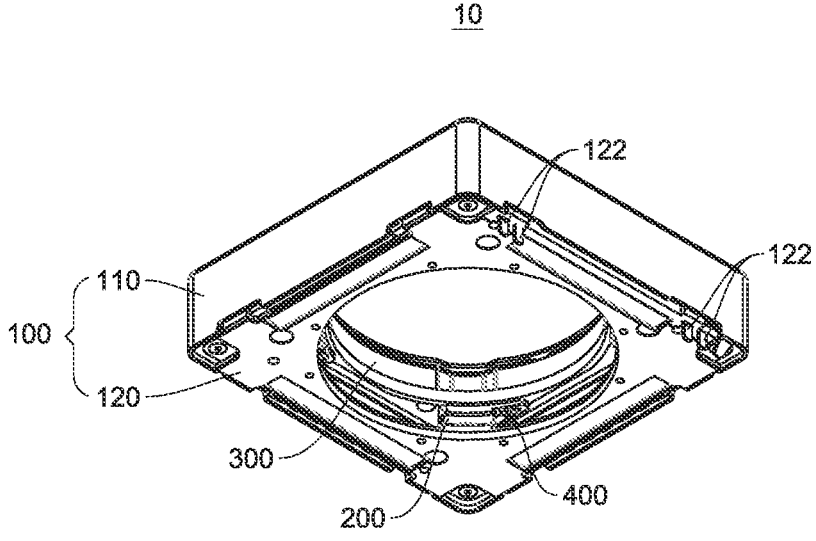
FIG. 1 is a perspective view of a lens module according to an embodiment of the present disclosure.
Figure 2:
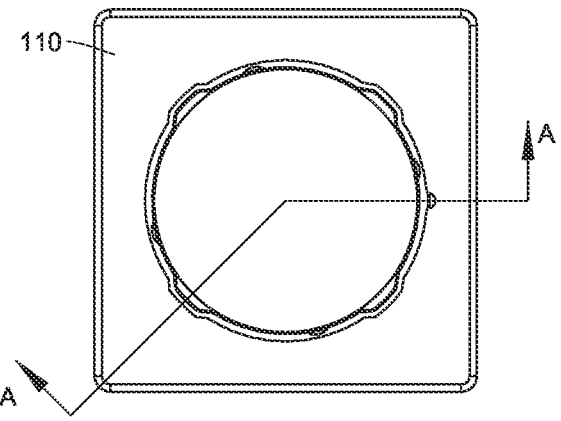
FIG. 2 is a top view of a lens module according to an embodiment of the present disclosure.

| | |
|---|---|
| 10 lens module | |
| 100 bearing structure | 110 upper shell |
| 111 top cover | 112 side wall |
| 120 base | 121 receiving groove |
| 122 base insert | |
| 200 support frame | 210 frame body |
| 211 movable hole | 212 second avoidance groove |
| 213 third avoidance groove | 220 frame insert |
| 221 insert connection part | 222 insert fixing part |
| 223 insert middle part | 230 fixing column |
| 300 lens barrel | 310 first avoidance groove |
| 320 fourth avoidance groove | 330 mounting slot |
| 340 avoidance cavity | |
| 400 adjusting mechanism | 410 focus assembly |
| 411 focus coil | 412 focus magnet |
| 413 focus circuit board | 414 focus IC module |
| 420 anti-shake assembly | 421 anti-shake coil |
| 422 anti-shake magnet | 423 anti-shake circuit board |
| 424 anti-shake IC module | 430 elastic piece structure |
| 431 upper elastic piece | 4311 first flexible arm |
| 4312 first connecting portion | 4313 second flexible arm |
| 4314 second connecting portion | 432 lower elastic piece |
| 4321 flexible connecting arm | 4322 reset and fixing portion |
| 440 suspension wire | 441 damping filler |
| 450 position sensing assembly | 451 sensing magnet |
| 452 magnetic sensor | |

DETAILED DESCRIPTION OF THE EMBODIMENTS

In order to make the objects, technical aspects, and advantages of the present disclosure clearer, the technical aspects of the present disclosure will be clearly and completely described below in conjunction with the accompanying drawings therein, and it will be apparent that the described embodiments are part of and not all the embodiments of the present disclosure. Based on the embodiments in the present disclosure, all other embodiments obtained without creative effort by those of ordinary skill in the art fall within the scope of protection of the present disclosure.

Referring to FIGS. 1 to 8, embodiments of the present disclosure provide a lens module 10. The lens module 10 includes a bearing structure 100, a support frame 200, a lens barrel 300, and an adjusting mechanism 400. The bearing structure 100 includes an upper shell 110 and a base 120. The upper shell 110 includes a top cover 111 and a side wall 112 connected to the base 120. The top cover 111 is disposed on a side of the side wall 112 far away from the base 120. The base 120 is configured to be electrically connected with an external circuit. The support frame 200 is suspended inside the bearing structure 100. The lens barrel 300 is suspended inside the support frame 200. The adjusting mechanism 400 includes a focus assembly 410, an anti-shake assembly 420, a plurality of elastic piece structures 430, and suspension wires 440. The focus assembly 410 includes a focus coil 411 wound around the lens barrel 300, a focus magnet 412 connected to a side of the top cover 111 facing the focus coil 411, and a focus circuit board 413. The anti-shake assembly 420 is connected to the base 120 and the support frame 200 and is configured to drive the support frame 200 to move relative to the base 120. The elastic piece structures 430 are connected between the support frame 200 and the lens barrel 300. The suspension wires 440 are connected between the support frame 200 and the base 120 and electrically connected with the support frame 200 and the base 120. The focus circuit board 413 is disposed on the lens barrel 300. Each elastic piece structure 430 is electrically connected with the focus circuit board 413, the anti-shake assembly 420, and the support frame 200.

In the lens module 10 of the present embodiment, by disposing the focus magnet 412 inside the top cover 111 of the upper shell 110, the inner space of the upper shell 110 can be fully utilized to make the structure between the lens barrel 300, the focus assembly 410, and the upper shell 110 more compact, thereby making the overall structure of the lens module 10 more compact and facilitating arrangement of the lens module in an electronic device. In addition, the power supply and signal transmission functions of the lens module 10 can be realized by using the elastic piece structures 430 to lead to the focus assembly 410 and the anti-shake assembly 420, such that the purpose of optimizing the internal structure of the lens module 10 can be further achieved.

In addition, by arranging the focus magnet 412 in the upper shell 110 (equivalent to a fixed part) of the bearing structure 100, compared with the conventional scheme in which the magnet is arranged on the movable member of the lens module 10, the overall mass of the movable member can be effectively reduced, the required driving force can be reduced when the focus assembly 410 moves, and the movement accuracy can be improved. The problem that the focus magnet 412 attracts or repels other members of the lens module 10 during moving of the focus assembly 410 and the anti-shake assembly 420 can also be effectively avoided, thereby improving the control accuracy of the lens module 10.

Figure 3:
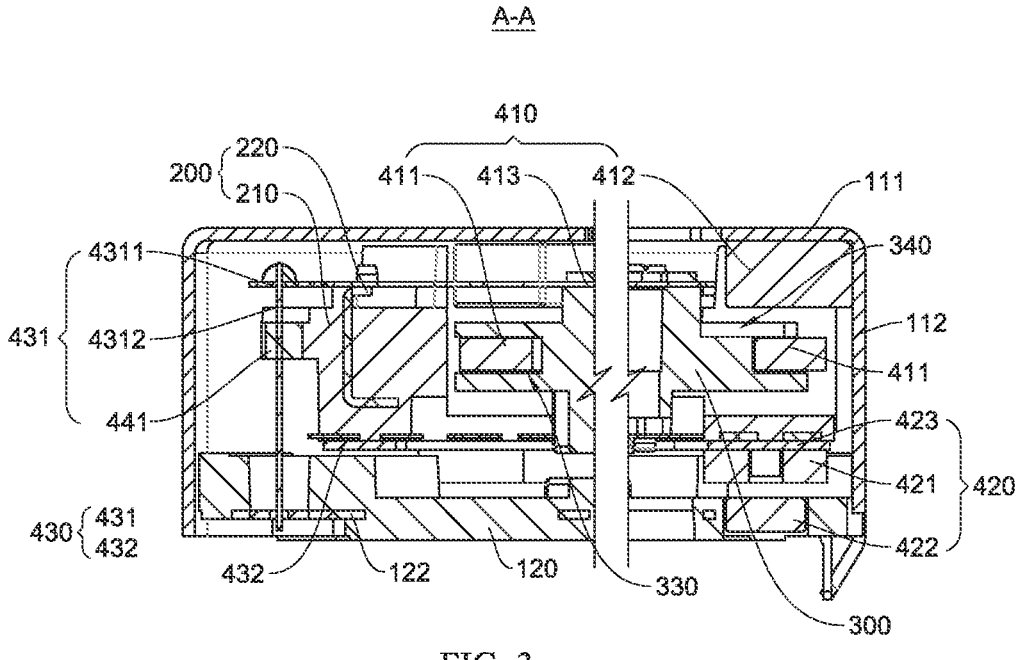
FIG. 3 is a sectional view of the lens module along line A-A in FIG. 2.
Figure 8:
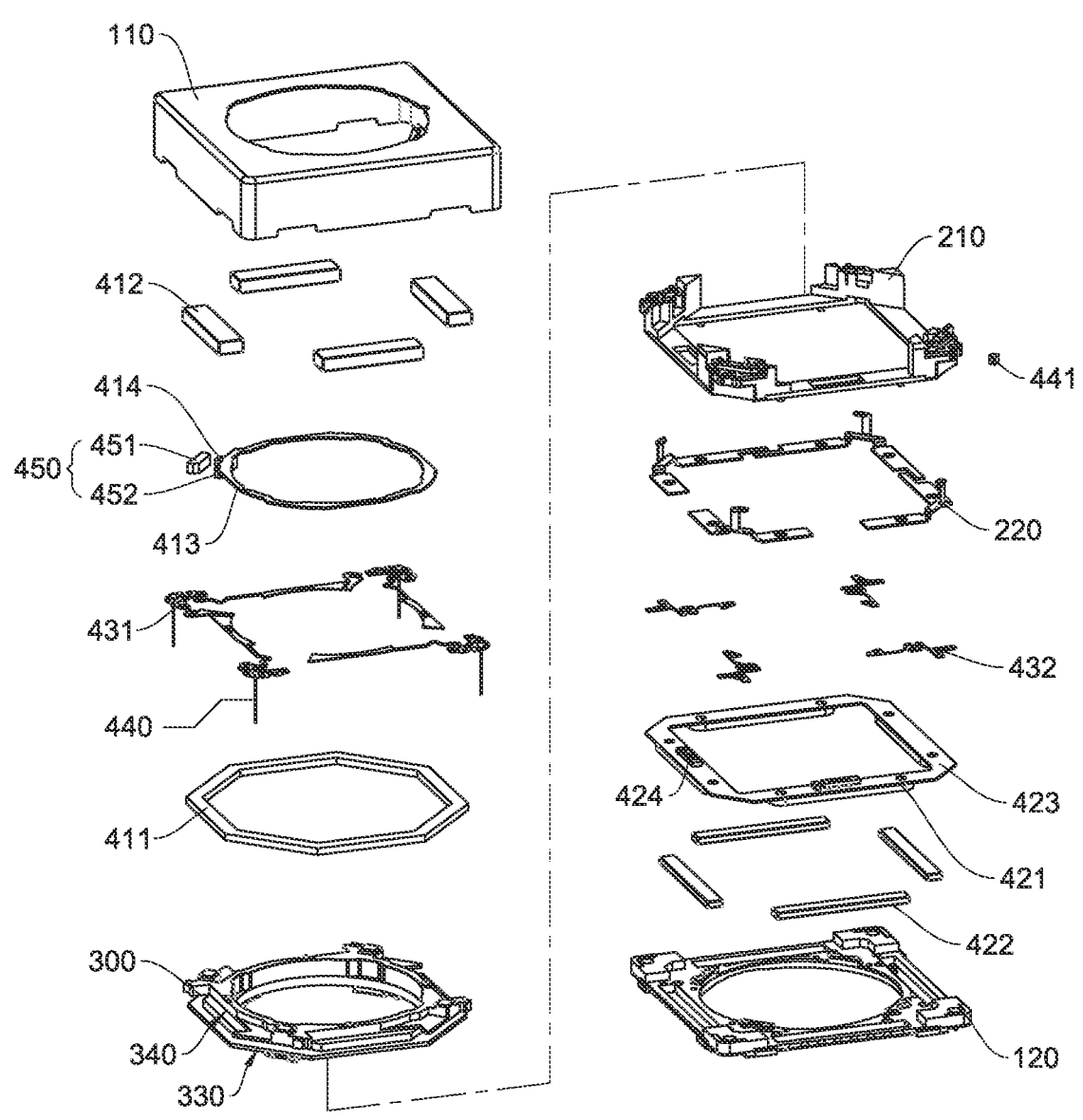
FIG. 8 is an exploded view of a lens module according to an embodiment of the present disclosure.
Figure 9:
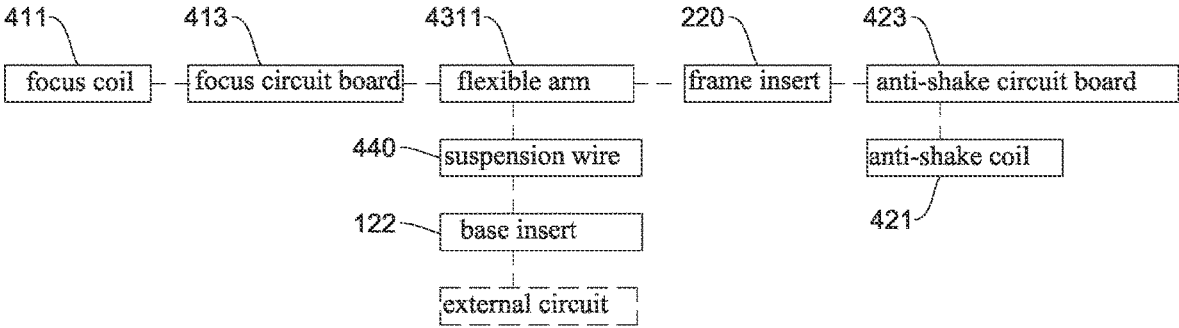
FIG. 9 is a schematic diagram of circuit connection of a lens module according to an embodiment of the present disclosure.

Referring to FIG. 1, FIG. 3, and FIG. 8, in one embodiment, the support frame 200, the focus coil 411, and the focus magnet 412 are sequentially arranged in a direction parallel to an optical axis of the lens barrel 300. The base 120 is embedded with base inserts 122. The support frame 200 includes a frame body 210 and a frame insert 220. The circuit conduction between the anti-shake assembly 420 and the focus assembly 410 can be realized by embedding the base inserts 122 into the base 120 to be connected with the elastic piece structures 430 and by connecting the frame insert 220 embedded within the frame body 210 to the anti-shake assembly 420 and the elastic piece structures 430. In addition, the overall strength of the base 120 and the support frame 200 can be improved, and the overall structure of the base 120 and the support frame 200 can be made more compact. In other embodiments, the lead function between the base 120 and the support frame 200 may be realized by means of external wiring, laser direct construction (LDS) technology, etc., which is not only limited herein.

Figure 7:
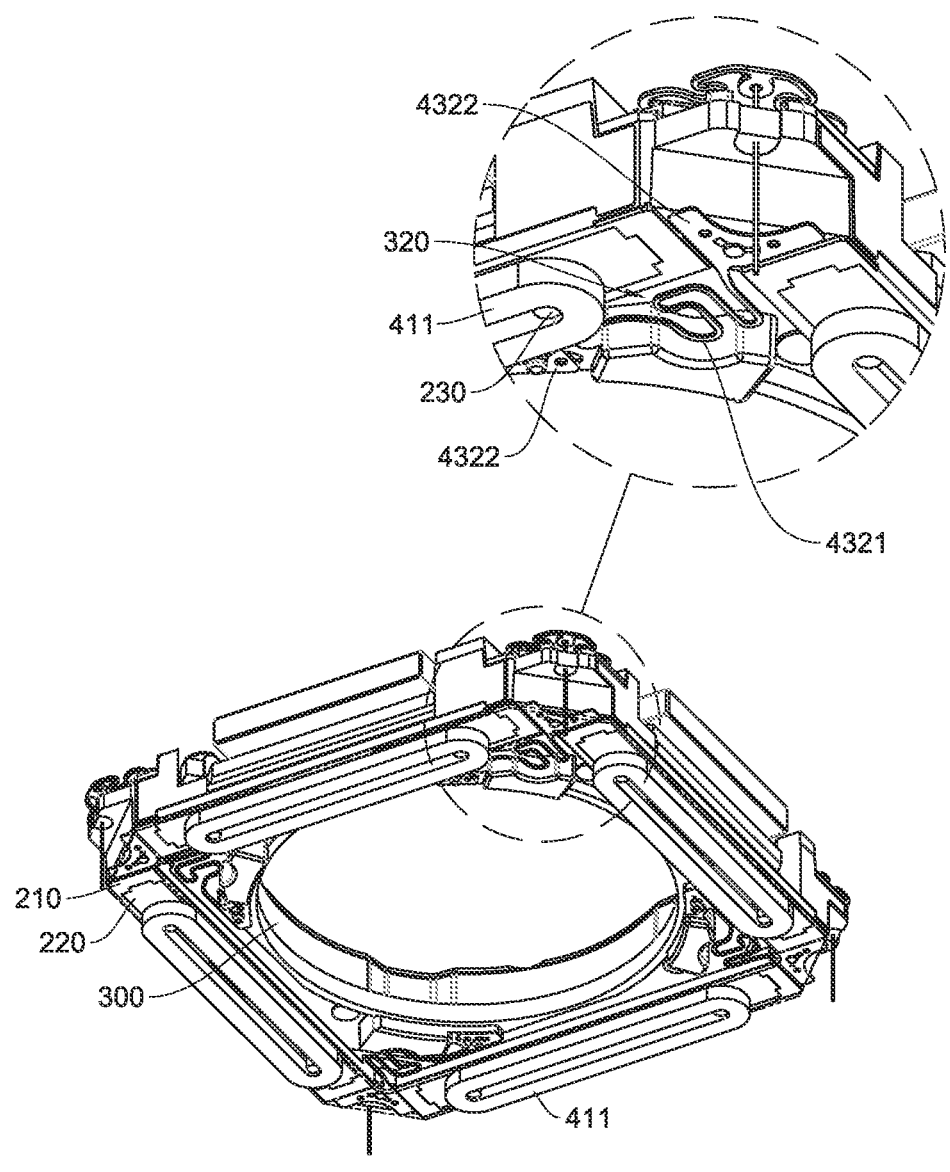
FIG. 7 is a schematic view of an internal structure of a lens module according to an embodiment of the present disclosure.

Specifically, the focus circuit board 413 is preferably a flexible printed circuit (FPC). As shown in FIG. 3 and FIG. 8, the focus circuit board 413 is disposed around an opening of the lens barrel 300 and is connected to the elastic piece structures 430. The focus circuit board 413 is electrically connected to the elastic piece structures 430. In this embodiment, the anti-shake circuit board 423 is preferably an FPC, so that the anti-shake circuit board 423 has a smaller thickness and is electrically connected to the elastic piece structures 430 to realize the lead function. As shown in FIG. 7, the anti-shake circuit board 423 is attached to the bottom of the support frame 200 and disposed around the lens barrel 300.

Specifically, referring to FIG. 2 to FIG. 6 and FIG. 8, each elastic piece structure 430 includes an upper elastic piece 431 and a lower elastic piece 432. The upper elastic piece 431 and the anti-shake coil 421 are respectively arranged on two opposite sides of an axial direction of the support frame

200, and specifically, may be respectively arranged on opposite sides of the support frame 200 along the optical axis of the lens barrel 300. The upper elastic piece 431 is connected to the support frame 200 and the lens barrel 300. The lower elastic piece 432 is connected to the support frame 200 and the lens barrel 300. The support frame 200 is electrically connected with the focus coil 411 and the anti-shake assembly 420. Each suspension wire 440 is connected with and electrically connected with the upper elastic piece 431 and the base 120.

With this configuration, when the lens barrel 300 is driven to move relative to the support frame 200 by the anti-shake coil 421, the upper elastic piece 431 can be deformed and can drive the lens barrel 300 to reset. By connecting the suspension wire 440 with the support frame 200, the support frame 200 can be driven to reset relative to the base 120, thereby making the structure of the upper elastic piece 431 and the support frame 200 more compact, and thus making the overall structure of the lens module 10 compact.

Figure 5:
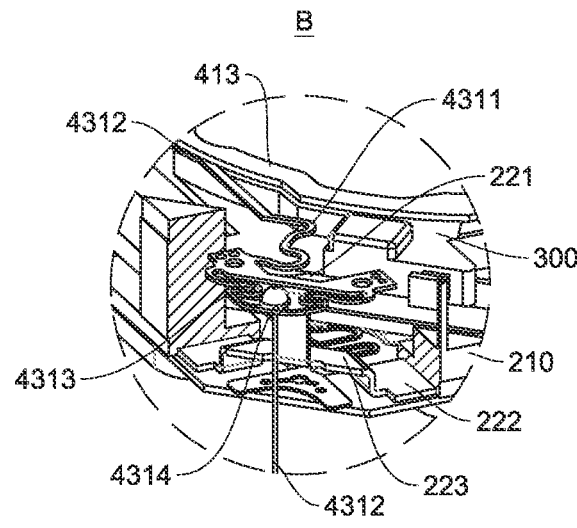
FIG. 5 is an enlarged view of part B of the lens module of FIG. 4.

Specifically, as shown in FIG. 5, the upper elastic piece 431 includes at least one first flexible arm 4311 and at least two first connecting portions 4312. The at least two first connecting portions 4312 are connected between the lens barrel 300 and the support frame 200. Each first flexible arm 4311 is connected to the at least two first connecting portions 4312. One end of two opposing ends of a respective suspension wire 440 is connected with and electrically connected with a respective first connecting portion 4312, and the other end of the two opposing ends of the suspension wire 440 is connected with and electrically connected with the base 120.

In this embodiment, the end of the suspension wire 440 can be welded and fixed with the first connecting portion 4312. Preferably, a certain amount of solder is covered at a joint between the suspension wire 440 and the first connecting portion 4312 to improve the firmness between the suspension wire 440 and the first connecting portion 4312. When the lens barrel 300 moves relative to the support frame 200, the first flexible arm 4311 can be deformed and store elastic potential energy. When the driving force of the anti-shake assembly 420 is removed or an elastic force of the first flexible arm 4311 counteracts the force generated by the electronic device due to shaking, the first flexible arm 4311 can drive the lens barrel 300 to reset. When there are a plurality of first flexible arms 4311, each of the plurality of first flexible arms 4311 is connected to the two first connecting portions 4312, the elastic acting force of the first flexible arms 4311 can be increased, thereby improving the reset effect of the upper elastic piece 431. As shown in FIG. 5, in the preferred embodiment, an extension path of the first flexible arm 4311 is preferably a curved surrounding structure to improve a deformation range and reset effect of the first flexible arm 4311. Specifically, there may be other numbers of upper elastic pieces 431, for example, may be two, three, four or more upper elastic pieces 431. The plurality of the upper elastic piece 431 are uniformly arranged in a circumferential direction of the lens barrel 300. The anti-shake effect and the reset stability of the anti-shake assembly 420 can be improved by providing the plurality of the upper elastic piece 431 to be connected to the lens barrel 300.

In one embodiment, a respective upper elastic piece 431 is integrally formed with a respective suspension wire 440.

With this configuration, the strength of the overall elastic structure formed by the combination of the upper elastic pieces 431 and the suspension wires 440 can be improved. In addition, the combination of the upper elastic piece 431 and the suspension wire 440 can have a more compact structure, so that the lens module 10 has a smaller volume.

Furthermore, the lens barrel 300 defines a first avoidance groove 310. The first avoidance groove 310 is defined on a side of the lens barrel 300 facing the first flexible arm 4311. An orthographic projection of the first flexible arm 4311 on the lens barrel 300 at least partially coincides with the first avoidance groove 310.

In this embodiment, by providing the first avoidance groove 310 on the lens barrel 300 to cooperate with the upper elastic piece 431, when the lens barrel 300 moves relative to the support frame 200 and produces deformation, the first avoidance groove 310 can provide an avoidance for the first flexible arm 4311 to avoid collision between the lens barrel 300 and the upper elastic piece 431, thereby improving the durability of the upper elastic piece 431 and making the structure between the upper elastic piece 431 and the support frame 200 and the lens barrel 300 more compact.

In one embodiment, the support frame 200 defines a second avoidance groove 212. The second avoidance groove 212 is defined on a side of the support frame 200 facing the first flexible 4311. An orthographic projection of the first flexible arm 4311 on the support frame 200 at least partially coincides with the second avoidance groove 212.

In this embodiment, by providing the second avoidance groove 212 on the support frame 200 to cooperate with the upper elastic piece 431, when the lens barrel 300 moves relative to the support frame 200, the second avoidance groove 212 can provide an avoidance for the first flexible arm 4311, so as to avoid collision between the support frame 200 and the upper elastic piece 431, thereby improving the durability of the upper elastic piece 431 and making the structure between the upper elastic piece 431 and the support frame 200 more compact.

Figure 6:
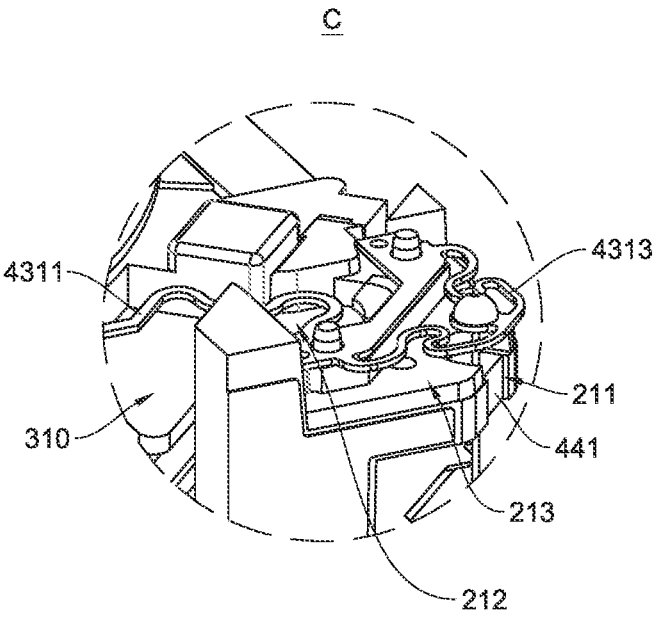
FIG. 6 is an enlarged view of part C of the lens module of FIG. 4.

Furthermore, as shown in FIGS. 5 and 6, the upper elastic piece 431 further includes a second flexible arm 4313 and a second connecting portion 4314. The second flexible arm 4313 is connected to the second connecting portion 4314 and one of the at least two first connecting portions 4312. The second connecting portion 4314 is connected to an end of the suspension wire 440 away from the base 120.

In this embodiment, the end portion of the suspension wire 440 is welded and fixed with the second connecting portion 4314. Preferably, a certain amount of solder is covered at a joint between the suspension wire 440 and the second connecting portion 4314 to improve the firmness between the suspension wire 440 and the second connecting portion 4314. When the support frame 200 moves relative to the base 120, the second flexible arm 4313 can be deformed and store elastic potential energy. When the driving force of the anti-shake assembly 420 is removed or the elastic force of the second flexible arm 4313 counteracts the force generated by the shaking of the electronic device, the second flexible arm 4313 can drive the support frame 200 to reset, thereby achieving the anti-shake function.

When there are a plurality of second flexible arms 4313, and a respective second flexible arm 4313 of the plurality of second flexible arms 4313 is connected to a respective first connecting portion 4312 of the at least two first connecting portions 4312 and the second connecting portion 4314, the elastic acting force of the second flexible arms 4313 can be increased, thereby improving the reset effect of the upper elastic piece 431. In the preferred embodiment, an extension path of the second flexible arm 4313 is preferably a curved surrounding structure to improve the deformation range and reset effect of the second flexible arm 4313.

Referring to FIG. 6, in one embodiment, the support frame 200 defines a third avoidance groove 213. The third avoidance groove 213 is defined on a side of the support frame 200 facing the second flexible arm 4313. An orthographic projection of the second flexible arm 4313 on the support frame 200 at least partially coincides with the third avoidance groove 213.

In this embodiment, by providing the third avoidance groove 213 on the support frame 200 to cooperate with the upper elastic piece 431, when the lens barrel 300 moves relative to the support frame 200, the third avoidance groove 213 can provide an avoidance for the second flexible arm 4313, so as to avoid collision between the support frame 200 and the upper elastic piece 431, thereby improving the durability of the upper elastic piece 431 and making the structure between the upper elastic piece 431 and the support frame 200 more compact.

Furthermore, as shown in FIGS. 3, 5, 7, and 8, the elastic piece structure 430 further includes the lower elastic piece 432. The lower elastic piece 432 is connected to the lens barrel 300 and the support frame 200. The lower elastic piece 432 is disposed on a side of the support frame 200 away from the upper elastic piece 431.

With this configuration, when the lens barrel 300 moves relative to the support frame 200, since the lens barrel 300 and the support frame 200 are connected through the lower elastic piece 432, the lower elastic piece 432 can provide an elastic driving force for reset of the lens barrel 300 and reduce the jitter of the lens barrel 300 relative to the support frame 200.

Specifically, as shown in FIG. 7, the lower elastic piece 432 includes a flexible connecting arm 4321 and at least two reset and fixing portions 4322. The at least two reset and fixing portions 4322 are connected to the flexible connecting arm 4321, where two reset and fixing portions 4322 are respectively connected to the lens barrel 300 and the support frame 200.

In the present embodiment, when the lens barrel 300 is moved relative to the support frame 200, the flexible connecting arm 4321 can be deformed and store elastic potential energy. When the driving force of the focus assembly 410 is removed or the elastic force of the flexible connecting arm 4321 counteracts the force generated by the electronic device due to shaking, the flexible connecting arm 4321 can drive the lens barrel 300 to reset. When there are a plurality of flexible connecting arms 4321, each of the plurality of flexible connecting arms 4321 is connected to the at least two reset and fixing portions 4322, the elastic acting force of the flexible connecting arms 4321 can be increased, thereby improving the reset effect of the upper elastic piece 431. As shown in FIG. 7, in the preferred embodiment, an extension path of the flexible connecting arm 4321 is preferably of a curved surrounding structure to improve the deformation range and the reset effect of the flexible connecting arm 4321. Specifically, there may be other numbers of lower elastic pieces 432, e.g., may be two, three, four or more lower elastic pieces 432. The plurality of lower elastic pieces 432 are uniformly disposed in the circumferential direction of the lens barrel 300. The focus reset effect and the reset stability of the focus assembly 410 can be improved by providing the plurality of lower elastic pieces 432 to be connected to the lens barrel 300 and the support frame 200.

Furthermore, the lens barrel 300 defines a fourth avoidance groove 320. The fourth avoidance groove 320 is provided on a side of the support frame 200 facing the flexible connecting arm 4321. An orthographic projection of the flexible connecting arm 4321 on the support frame 200 at least partially coincides with the fourth avoidance groove 320.

In this embodiment, by defining the fourth avoidance groove 320 on the lens barrel 300 to cooperate with the flexible connecting arm 4321, when the lens barrel 300 moves relative to the support frame 200, the fourth avoidance groove 320 can provide an avoidance for the flexible connecting arm 4321, so as to avoid collision between the lens barrel 300 and the lower elastic piece 432, thereby improving the durability of the lower elastic piece 432 and making the structure between the lower elastic piece 432 and the support frame 200 more compact.

Figure 4:
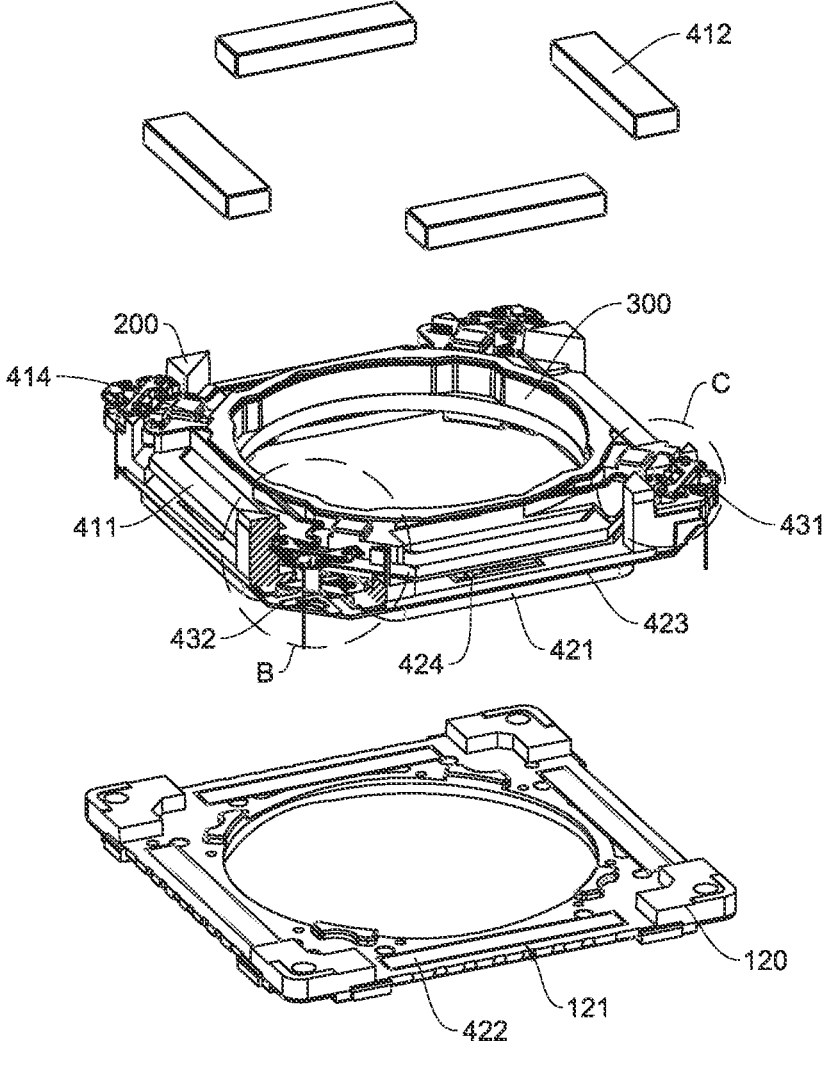
FIG. 4 is a partial structural exploded view of a lens module according to an embodiment of the present disclosure.

Referring to FIGS. 4 to 6, in one embodiment, the support frame 200 defines a plurality of movable holes 211 penetrating the support frame 200. A respective suspension wire 440 is provided through the movable hole 211 and spaced apart from an inner wall of a respective movable hole 211.

It shall be understood that by defining the movable hole 211 to cooperate with the suspension wire 440, collision between the lens barrel 300 and the suspension wire 440 can be avoided during deformation, to improve the durability of the suspension wire 440, and the combined structure between the suspension wire 440 and the support frame 200 can be made more compact, which is convenient for realizing the miniaturization design requirement of the lens module 10.

Furthermore, the upper elastic piece 431 further includes a plurality of damping fillers 441. A respective damping filler 441 fills in the respective movable hole 211 and at least partially wraps the respective suspension wire 440.

With this configuration, when the suspension wire 440 is deformed or displaced with respect to the support frame 200, the damping filler 441 can provide damping for the suspension wire 440, thereby providing a cushioning effect for the relative displacement between the support frame 200, the lens barrel 300, and the base 120.

Referring to FIGS. 3, 4, 7, and 8, the anti-shake assembly 420 includes at least one anti-shake coil 421, at least one anti-shake magnet 422, and an anti-shake circuit board 423. The base 120 defines at least one receiving groove 121. The at least one anti-shake coil 421 is disposed at the bottom of the support frame 200. Each anti-shake magnet 422 is disposed in a respective receiving groove 121 and is disposed corresponding to a respective one of the at least one anti-shake coil 421.

In the present embodiment, the number of the anti-shake coils 421 may be at least two. The two anti-shake coils 421 are cooperated with the two anti-shake magnets 422, respectively, to drive the support frame 200 to move in a X direction and a Y direction in a plane perpendicular to the optical axis of the lens barrel 300 to realize the anti-shake function. When the anti-shake assembly 420 includes a plurality of anti-shake coils 421, the plurality of anti-shake coils 421 may be connected through the anti-shake circuit board 423.

In one embodiment, a direction of a magnetic induction line of the anti-shake coil 421 is directed to or away from the anti-shake magnet 422. When the anti-shake coil 421 is energized, a magnetic force can be generated between the anti-shake coil 421 and the anti-shake magnet 422 to realize the function that the anti-shake assembly 420 drives the support frame 200 to move in the X direction and/or the Y direction.

In addition, compared with the conventional scheme in which the magnet is arranged on the movable member of the lens module, in embodiments of the disclosure, by fixing the anti-shake magnet 422 in the base 120, fixing the anti-shake magnet 422 in the base 120 (equivalent to the fixed part) and fixing the focus magnet 412 on the upper shell 110 can effectively reduce the mass of the support frame 200 and the lens barrel 300, so as to reduce the driving force required by the focus assembly 410 and the anti-shake assembly 420 when driving the support frame 200 and the lens barrel 300 to move, and improve the movement accuracy of the adjusting mechanism 400. In addition, the anti-shake magnet 422 is provided in the base 120, so that the anti-shake magnet 422 can also avoid generating additional attraction or repulsion force on other moving parts, thereby improving the control accuracy of the lens module 10.

Specifically, as shown in FIG. 7, the support frame 200 further includes a fixing column 230. The fixing column 230 is provided at the bottom of the frame body 210 and a respective anti-shake coil 421 is wound around the fixing column 230.

In the present embodiment, by arranging the fixing column 230 to cooperate with the anti-shake coil 421, mounting and fixing of the anti-shake coil 421 and the frame body 210 can be facilitated. It shall be understood that when there are two fixing columns 230, the anti-shake coil 421 may be sequentially wound around the two fixing columns 230 to form an anti-shake coil 421 having a cross section having, for example, a circular arc shape or a long arc shape.

Specifically, as shown in FIG. 5, the frame insert 220 includes an insert connection part 221, an insert fixing part 222, and an insert middle part 223. The insert connection part 221 is connected to one side of two opposite sides of the insert middle part 223 and the insert fixing part 222 is connected to the other side of the two opposite sides of the insert middle part 223. The insert middle part 223 is bent from the insert fixing part 222 toward the upper elastic piece 431. The insert connection part 221 is at least partially extended from the frame body 210 and electrically connected with the upper elastic piece 431. The insert fixing part 222 is at least partially exposed from the bottom of the frame body 210 and electrically connected with the anti-shake circuit board 423, thereby realizing circuit conduction between the focus assembly 410, the anti-shake assembly 420, the elastic piece structures 430, and the base 120.

In one embodiment, the base 120 has four base inserts 122. Each of the four base inserts 122 is electrically connected to a respective one of the fourth anti-shake coils 421 and the focus coil 411 through a respective one of the four elastic piece structures 430. In this embodiment, the focus assembly 410 is in parallel with an integrated circuit (IC) of each of the two anti-shake coils 421 of the anti-shake assembly 420 and is connected with the four base inserts 122. Two of the four base inserts 122 are used for power supply (VCC) and ground (GND), and the other two of the four base inserts 122 are used for transmitting control signals (including but not limited to analog signals and digital signals) to the two anti-shake coils 421 and the focus coil 411 respectively. With this configuration, the base 120 can be electrically connected to the external control circuits through the four base inserts 122, and the overall structure is compact, which facilitates the arrangement of the lens module 10 in the electronic device.

Specifically, as shown in FIGS. 4 and 8, the focus assembly 410 further includes a focus IC module 414. The focus IC module 414 is connected to the focus circuit board 413 and electrically connected with the elastic piece structure 430. The adjusting mechanism 400 further includes a sensing magnet 451, and the sensing magnet 451 is disposed on the support frame 200. The focus IC module 414 is magnetically cooperated with the sensing magnet 451 and is electrically connected with the focus coil 411, so that the focus IC module 414 forms a closed-loop control circuit.

In this embodiment, the focus IC module 414 includes a power supply IC for controlling the focus coil 411 and a Hall sensor cooperated with the sensing magnet 451. In this way, the power supply IC and the Hall sensor can be combined to form a closed-loop control circuit, such that the control accuracy of the focus assembly 410 can be improved and the integration level of the focus IC module 414 in the focus assembly 410 can be improved, thereby improving the structural compactness of the lens module 10.

In some embodiments, referring to FIG. 4, the adjusting mechanism 400 further includes a position sensing assembly 450. The position sensing assembly 450 (e.g., position sensor) is signally connected to the base 120 and is used to obtain a relative position between the lens barrel 300 and the support frame 200.

In the present embodiment, the position sensing assembly 450 is separately provided and includes a sensing magnet 451 and a magnetic sensor 452. The sensing magnet 451 is magnetically cooperated with the magnetic sensor 452. One of the sensing magnet 451 and the magnetic sensor 452 is disposed on the lens barrel 300, and the other one of the sensing magnet 451 and the magnetic sensor 452 is disposed on the support frame 200. It shall be understood that in the present embodiment, there is a need to separately provide a power supply IC corresponding to the focus coil 411 in the focus assembly 410, to realize functions of controlling the focus coil 411 and position sensing.

With this configuration, when the lens barrel 300 moves relative to the support frame 200, the magnetic sensor 452 acquires a change in the magnetic force signal of the sensing magnet 451 to judge the relative position of the lens barrel 300 and the support frame 200, thereby realizing the position feedback function of the adjusting mechanism 400. Specifically, the magnetic sensor 452 may be a Hall sensor. In other embodiments, the position sensing assembly 450 may also be an infrared sensor or other position sensors, which is not uniquely limited herein.

Referring to FIGS. 4 and 8, the anti-shake assembly 420 further includes at least one anti-shake IC module 424. Each respective anti-shake IC module 424 is connected to the anti-shake circuit board 423 and disposed corresponding to a respective anti-shake magnet 422. The anti-shake IC module 424 is electrically connected with the anti-shake coil 421.

In this embodiment, the anti-shake IC module 424 includes a power supply IC for controlling the anti-shake coil 421 and a Hall sensor cooperated with the sensing magnet 451. In this way, the power supply IC and the Hall sensor can be combined to form a closed-loop control circuit, such that the control accuracy of the anti-shake assembly 420 can be improved and the integration level of the anti-shake IC module 424 in the anti-shake assembly 420 can be improved to improve the structural compactness of the lens module 10. Specifically, there may be two anti-shake IC modules 424 and the two anti-shake IC modules 424 are cooperated with the two anti-shake magnets 422, respectively, to control the position between the support frame 200 and the base 120 in the X direction and the Y direction perpendicular to the optical axis of the lens barrel 300 to realize the anti-shake function.

In some embodiments, the support frame 200 further defines a hole on a side facing the anti-shake circuit board 423 and corresponding to the anti-shake IC module 424.

The anti-shake IC module 424 is accommodated in the hole, thereby further improving the compactness of the combination between the anti-shake circuit board 423 and the support frame 200.

Specifically, as shown in FIGS. 4 and 8, the lens barrel 300 defines a mounting slot 330 on an outer circumferential wall of the lens barrel 300. The focus coil 411 is wound around the lens barrel 300 and accommodated in the mounting slot 330.

It shall be understood that, by defining the mounting slot 330 on the lens barrel 300 to cooperate with the focus coil 411, the mounting slot 330 can position the mounting of the focus coil 411, to improve the mounting convenience and the mounting accuracy of the focus coil 411.

Furthermore, as shown in FIGS. 3 and 8, the lens barrel 300 defines an avoidance cavity 340 on a side of the lens barrel 300 facing the focus magnet 412. The focus magnet 412 is suspended in the avoidance cavity 340.

With this arrangement, when the lens barrel 300 and the support frame 200 move relative to the bearing structure 100, the focus magnet 412 can be accommodated in the avoidance cavity 340 of the lens barrel 300, and the focus magnet 412 can be avoided by the avoidance cavity 340, so as to avoid collision between the focus magnet 412 and the lens barrel 300, thereby ensuring the adjustment smoothness and durability of the adjusting mechanism 400.

Specifically, referring to FIGS. 3 to 7, and FIG. 9, in the present embodiment, the suspension wire 440 is electrically connected with the upper elastic piece 431 and the base insert 122 in the base 120, and is electrically connected to an external circuit through the base insert 122. The upper elastic piece 431 is electrically connected to the focus circuit board 413 and the frame insert 220 in the support frame 200. An end of the frame insert 220 away from the upper elastic piece 431 is electrically connected to the anti-shake circuit board 423, and in this case, the anti-shake circuit board 423 may be connected to the plurality of anti-shake coils 421 to realize the anti-shake adjustment function of the anti-shake assembly 420. The focus circuit board 413 is electrically connected to the upper elastic pieces 431 and is lead to the focus coil 411, thereby forming a lead circuit of the lens module 10. Therefore, the overall structure is compact, which facilitating arrangement of the lens module 10 in the electronic device.

The disclosure also provides an electronic device. The electronic device includes a host device and the lens module 10 described in any of the above embodiments, where the lens module 10 is arranged in the host device.

It shall be understood that in the electronic device of the present embodiment, by providing the lens module 10 in any of the above-mentioned embodiments, the internal space of the upper shell 110 can be fully utilized by arranging the focus magnet 412 inside the top cover 111 of the upper shell 110 in the lens module 10, the internal space of the upper shell 110 can be fully utilized to make the structure between the lens barrel 300, the focus assembly 410, and the upper shell 110 more compact, thereby making the overall structure of the lens module 10 more compact and facilitating the arrangement of the lens module in the electronic device. In addition, the power supply and signal transmission functions of the lens module 10 can be realized by using the elastic piece structure 430 to lead to the focus assembly 410 and the anti-shake assembly 420, thereby optimizing the internal structure of the lens module 10. Specifically, the electronic device includes, but is not limited to, a tablet PC, and a smart phone.

In the description of embodiments of the disclosure, it is to be noted that orientation or positional relationships indicated by the terms "center," "longitudinal," "transverse," "upper," "lower," "front," "rear," "left," "right," "vertical," "horizontal," "top," "bottom," "inner," "outer" and the like are orientation or positional relationships shown in the drawings, which are intended for ease of description and simplification of the embodiment of the disclosure only, and are not intended to indicate or imply that the device or element in question must have a particular orientation, be constructed and operate in a particular orientation and therefore should not be construed as limiting to the embodiment of the disclosure. Furthermore, the terms "first", "second", and "third" are used for descriptive purposes only and should not be understood to indicate or imply relative importance.

In the description of embodiments of the present disclosure, it is to be noted that unless otherwise expressly specified and limited, the terms "connecting/connected" and "coupling" should be understood in a broad sense, for example, they may be fixed connections, detachable connections, or integral connections. Alternatively, they may be understood as mechanical connection or electrical connection; or can be directly connection or indirectly connection through an intermediary. The particular meaning of the above terms in the embodiments of the present disclosure can be understood in particular to those of ordinary skill in the art.

In embodiments of the disclosure, the first feature being "above" or "below" the second feature may be in direct contact with the first feature and the second feature, or the first feature and the second feature may be in indirect contact through an intermediate medium, unless otherwise expressly specified and defined. Moreover, the first feature being "above", "on", and "upper" the second feature may mean that the first feature is directly above or obliquely above the second feature, or simply indicate that the first feature is horizontally higher than the second feature. The first feature is "below", "under", and "beneath" the second feature, may mean that the first feature is directly below or obliquely below the second feature, or simply mean that the horizontal height of the first feature is less than that of the second feature.

In the description of this specification, descriptions of the reference terms "one embodiment," "some embodiments," "example," "specific example," or "some examples," etc. mean that specific features, structures, materials, or features described in connection with the embodiments or examples are included in at least one embodiment or example of an embodiment of the disclosure. In this specification, the schematic formulation of the above terms need not be directed to the same embodiments or examples. Further the specific features, structures, materials, or characters described may be combined in a suitable manner in any one or more embodiments or examples. Furthermore, without contradicting, one another those skilled in the art may combine different embodiments or examples described in this specification and features of different embodiments or examples.

Finally, it is to be noted that the above embodiments are only used to illustrate the technical scheme of the present disclosure, but not to limit it. Although the present disclosure has been described in detail with reference to the foregoing embodiments, it is to be understood by those of ordinary skill in the art that the technical scheme described in the foregoing embodiments can still be modified or some technical features thereof can be equivalently replaced.

These modifications or substitutions do not depart the essence of the corresponding technical proposal from the spirit and scope of the technical proposal of the embodiments of the present disclosure.

What is claimed is:

1. A lens module, comprising:

a bearing structure including an upper shell and a base, wherein the upper shell includes a top cover and a side wall connected with the base, and the top cover is disposed at a side of the side wall away from the base, and the base is configured to be electrically connected with an external circuit;

a support frame suspended inside the bearing structure;

a lens barrel suspended inside the support frame; and an adjusting mechanism including a focus assembly, an anti-shake assembly, a plurality of elastic piece structures, and suspension wires, wherein the focus assembly includes a focus coil, a focus magnet, and a focus circuit board, the focus coil is wound on the lens barrel, the focus magnet is connected to a side of the top cover facing the focus coil, and the anti-shake assembly is configured to drive the support frame to move relative to the base, wherein the plurality of elastic piece structures are connected between the lens barrel and the support frame, each respective suspension wire of the suspension wires is connected and electrically connected with the support frame and the base, the focus circuit board is disposed on the lens barrel, and a respective elastic piece structure is electrically connected with the focus circuit board, the anti-shake assembly, and the support frame, wherein the respective elastic piece structure includes an upper elastic piece and a lower elastic piece, wherein the upper elastic piece is disposed on one side of two opposing sides of the support frame and the lower elastic piece is disposed on another side of the two opposing sides of the support frame, and wherein the upper elastic piece is connected to the lens barrel and the support frame, the lower elastic piece is connected to the lens barrel and the support frame, and the support frame is electrically connected with the focus coil, and wherein the respective suspension wire is connected and electrically connected with the respective upper elastic piece and the base;

wherein the upper elastic piece includes at least one first flexible arm and at least two first connecting portions, wherein the at least two first connecting portions are connected between the lens barrel and the support frame, each of the at least one first flexible arm is connected to the at least two connecting portions, and an end of two opposing ends of the respective suspension wire is connected and electrically connected with a respective first connecting portion and another end of the two opposing ends of the respective suspension wire is connected and electrically connected with the base.

2. The lens module of claim 1, wherein the lower elastic piece includes a flexible connecting arm and at least two reset and fixing portions connected to the flexible connecting arm, wherein two of the at least two reset and fixing portions are respectively connected to the lens barrel and the support frame.

3. The lens module of claim 1, wherein the anti-shake assembly includes at least one anti-shake coil, at least one anti-shake magnet, and an anti-shake circuit board, wherein the base defines at least one receiving groove, each respective anti-shake magnet is accommodated in a respective receiving groove and is arranged corresponding to a respective anti-shake coil, the anti-shake circuit board is attached to a side of the support frame facing the respective anti-shake magnet, and the anti-shake coil is disposed on a side of the anti-shake circuit board facing the anti-shake magnet.

4. The lens module of claim 3, wherein the support frame includes a frame body and a frame insert embedded in the frame body, and the frame insert is electrically connected with the plurality of elastic piece structures and the anti-shake circuit board.

5. The lens module of claim 1, wherein the focus assembly further includes a focus IC module connected to the focus circuit board, and the focus IC module is electrically connected with the plurality of elastic piece structures, and wherein the adjusting mechanism further includes a sensing magnet, and the sensing magnet is disposed on the support frame, and wherein the focus IC module is magnetically cooperated with the sensing magnet, and the focus IC module is electrically connected with the focus coil, to enable that the focus IC module forms a closed-loop control circuit.

6. The lens module of claim 1, wherein the lens barrel defines a mounting slot on an outer circumferential wall of the lens barrel, and the focus coil is wound around the lens barrel and accommodated in the mounting slot, and wherein the lens barrel defines an avoidance cavity on a side of the lens barrel facing the focus magnet, and the focus magnet is suspended in the avoidance cavity.

7. An electronic device, comprising:
a host device; and
the lens module of claim 1, wherein the lens module is arranged in the host computer.

8. The electronic device of claim 7, wherein the lower elastic piece includes a flexible connecting arm and at least two reset and fixing portions connected to the flexible connecting arm, wherein two of the at least two reset and fixing portions are respectively connected to the lens barrel and the support frame.

9. The electronic device of claim 7, wherein the anti-shake assembly includes at least one anti-shake coil, at least one anti-shake magnet, and an anti-shake circuit board, wherein the base defines at least one receiving groove, each respective anti-shake magnet is accommodated in a respective receiving groove and is arranged corresponding to a respective anti-shake coil, the anti-shake circuit board is attached to a side of the support frame facing the respective anti-shake magnet, and the anti-shake coil is disposed on a side of the anti-shake circuit board facing the anti-shake magnet.

10. The electronic device of claim 9, wherein the support frame includes a frame body and a frame insert embedded in the frame body, and the frame insert is electrically connected with the plurality of elastic piece structures and the anti-shake circuit board.

11. The electronic device of claim 7, wherein the focus assembly further includes a focus IC module connected to the focus circuit board, and the focus IC module is electrically connected with the plurality of elastic piece structures, and wherein the adjusting mechanism further includes a sensing magnet, and the sensing magnet is disposed on the support frame, and wherein the focus IC module is magnetically cooperated with the sensing magnet, and the focus IC module is electrically connected with the focus coil, to enable that the focus IC module forms a closed-loop control circuit.

12. The electronic device of claim 7, wherein the lens barrel defines a mounting slot on an outer circumferential wall of the lens barrel, and the focus coil is wound around the lens barrel and accommodated in the mounting slot, and wherein the lens barrel defines an avoidance cavity on a side of the lens barrel facing the focus magnet, and the focus magnet is suspended in the avoidance cavity.

* * * * *